(12) United States Patent
Sakraschinsky et al.

(10) Patent No.: US 8,944,091 B2
(45) Date of Patent: Feb. 3, 2015

(54) SYSTEM FOR VENTILATING AND VENTING CONTAINERS CONTAINING A FLUID VOLUME

(75) Inventors: Michael Sakraschinsky, St. Ingbert (DE); Volkmar Klein, Zweibrëcken (DE)

(73) Assignee: Hydac Filtertechnik GmbH, Sulzbach/Saar (DE)

(*) Notice: Subject to any disclaimer, the term of this patent is extended or adjusted under 35 U.S.C. 154(b) by 0 days.

(21) Appl. No.: 13/261,610

(22) PCT Filed: Aug. 12, 2011

(86) PCT No.: PCT/EP2011/004051
§ 371 (c)(1),
(2), (4) Date: Apr. 11, 2013

(87) PCT Pub. No.: WO2012/028255
PCT Pub. Date: Mar. 8, 2012

(65) Prior Publication Data
US 2014/0048149 A1    Feb. 20, 2014

(30) Foreign Application Priority Data
Sep. 3, 2010 (DE) .................. 10 2010 036 294

(51) Int. Cl.
*F24D 19/08* (2006.01)
*F16H 57/027* (2012.01)

(52) U.S. Cl.
CPC ............... *F16H 57/027* (2013.01); *Y10S 55/19* (2013.01)
USPC ..................... 137/197; 210/321.87; 55/385.3; 55/385.4; 55/DIG. 19; 123/41.86

(58) Field of Classification Search
USPC .................. 137/177, 197, 154; 123/572–574, 123/41.86; 210/321.87, 447; 55/503, 385.3, 55/385.4, DIG. 19; 285/305, 319, 321, 322
See application file for complete search history.

(56) References Cited

U.S. PATENT DOCUMENTS

| | | | | |
|---|---|---|---|---|
| 2,890,900 A | * | 6/1959 | Williamson, Jr. et al. | 285/238 |
| 3,031,335 A | * | 4/1962 | Segal et al. | 442/66 |
| 3,137,284 A | * | 6/1964 | Hultgren | 123/572 |
| 3,317,043 A | * | 5/1967 | Vanderpoel | 210/442 |

(Continued)

FOREIGN PATENT DOCUMENTS

| | | |
|---|---|---|
| DE | 100 47 199 A1 | 4/2002 |
| DE | 101 11 241 A1 | 9/2002 |

(Continued)

*Primary Examiner* — Stephen M Hepperle
*Assistant Examiner* — Craig J Price
(74) *Attorney, Agent, or Firm* — Roylance, Abrams, Berdo & Goodman LLP

(57) ABSTRACT

A system for ventilating and venting containers containing a fluid volume, such as gearboxes containing an oil filling, has a line system connecting the container to the atmosphere. Upon changes in the volumes in the container due to temperature changes, pressure is equalized. The line system contains a separating housing (12) in which a separating medium (46) having oleophobic and hydrophobic properties separates a first space (42) connected to the container from a second space (44) connected to the atmosphere. Line connections (10, 14) on the separating housing (12) are provided such that liquid-phase substances on opposite sides of the separating medium (46) can flow out of the first space (42) to the container and can drain out of the second space (44) to the atmosphere.

16 Claims, 3 Drawing Sheets

(56) References Cited

U.S. PATENT DOCUMENTS

| | | | |
|---|---|---|---|
| 3,388,825 A | 6/1968 | Miller | |
| 4,366,816 A * | 1/1983 | Bayard et al. | 604/403 |
| 4,493,717 A * | 1/1985 | Berger et al. | 55/330 |
| 5,029,904 A * | 7/1991 | Hunt | 285/319 |
| 6,524,361 B1 * | 2/2003 | Thornton et al. | 55/385.4 |
| 6,579,342 B2 * | 6/2003 | Wang et al. | 55/524 |
| 6,641,637 B2 * | 11/2003 | Kallsen et al. | 55/385.3 |
| 7,442,222 B2 * | 10/2008 | Dworatzek et al. | 55/503 |
| 7,562,652 B2 * | 7/2009 | Hommes et al. | 123/572 |
| 8,409,317 B2 * | 4/2013 | Bannister | 55/503 |
| 8,414,675 B2 * | 4/2013 | Iddings et al. | 55/502 |
| 8,480,778 B2 * | 7/2013 | Baseotto et al. | 55/498 |
| 2008/0223347 A1 | 9/2008 | Hommes et al. | |

FOREIGN PATENT DOCUMENTS

| | | |
|---|---|---|
| DE | 102 49 087 A1 | 5/2004 |
| WO | WO 2007/022340 A2 | 2/2007 |
| WO | WO 2007/133403 A2 | 11/2007 |

* cited by examiner

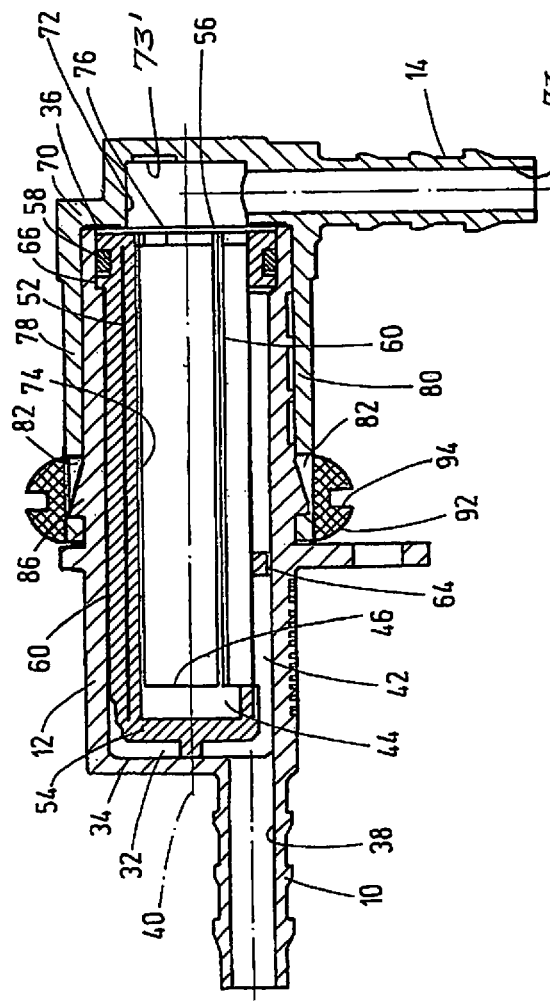
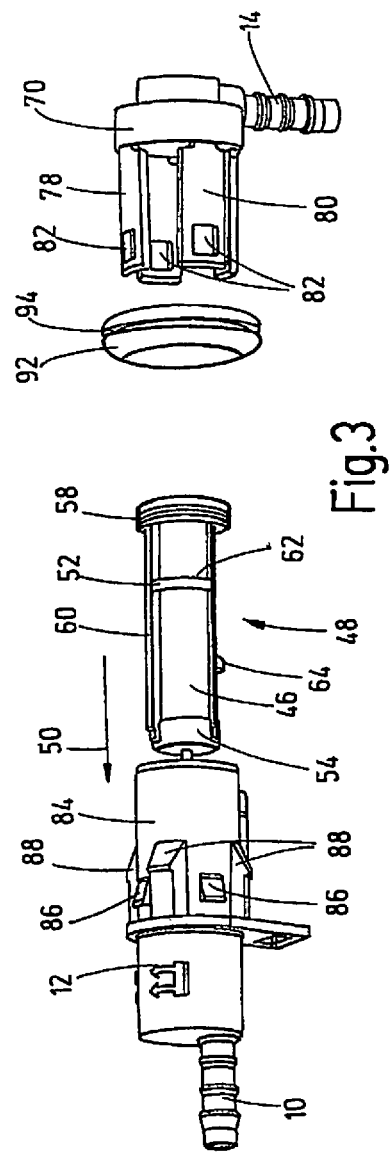
Fig.3
Fig.4

US 8,944,091 B2

SYSTEM FOR VENTILATING AND VENTING CONTAINERS CONTAINING A FLUID VOLUME

FIELD OF THE INVENTION

The invention relates to a system for ventilating and venting containers containing a fluid volume, such as gearboxes containing an oil filling. A line system connects the pertinent container to the atmosphere. Upon changes in the fluid volumes located in the container due to temperature changes, pressure equalization is enabled.

BACKGROUND OF THE INVENTION

Venting and ventilation systems are known in the prior art. Containers located in technical systems and which are filled with operating fluids, for example, an oil-filled gearbox, above the oil surface contain a certain air volume. The air volume, among other things, is used for compensation of volume changes of the oil filling caused by temperature changes. The line system leading from the container, for example, a gearbox, to the atmosphere prevents pressure differences from building up that could lead to leaks on the sealing system, for example, on housing passages. In systems operated over a large temperature range, such as, for example, in gearboxes, where a large temperature span exists between the cold start and the operating temperature, in operation, considerable volumetric flows of air result within the line system for pressure equalization. In particular, the risk exists that a discharge of oil or oil condensate to the atmosphere with the volumetric flow may occur or an entry of foreign materials from the atmosphere may take place.

SUMMARY OF THE INVENTION

An object of the invention is to provide an improved ventilating and venting system having an increased amount of operating reliability with respect to preventing the discharge of liquid phase substances and the entry of foreign substance from the atmosphere.

According to the invention, this object is basically achieved by a ventilating and venting system having a line system containing a separating housing in which a separating medium with oleophobic and hydrophobic properties separates a first space connected to the container from a second space connected to the atmosphere. On the separating housing, line connections are arranged such that liquid phase substances on opposite sides of the separating medium can drain out of the first space to the container and out of the second space to the atmosphere. The oleophobic property of the separating medium prevents an overflow of oil to the atmosphere side within the separating housing. At the same time, the hydrophobic property of the separating medium prevents the possibility of an entry of polar fluids, for example water, up to a material-specific pressure difference from the vicinity. Pressure equalization is possible in the form of the air volume without loading with liquid phase substances for a surface not completely wetted with liquid. The protection offered by the system according to the invention against ingress of water from the vicinity is especially important and advantageous when the system is used in containers of systems operated in a wet environment.

Especially in containers, such as gearboxes in automotive engineering where during operation of the vehicles under wet conditions or cleaning of the vehicles in car washes or when washing by hand, the entry of water could be a concern if the protective action offered according to the invention were not present.

Especially advantageously, the separating medium can be formed by a filter medium having oleophobic and hydrophobic properties. In this way, the separating medium separates not only water that may enter, but also offers protection against ingress of solid particles. Especially, when used in automotive engineering, this arrangement prevents road dust or other dirt particles from being able to travel into the gearbox in operation.

Especially advantageously, a mount can fix the separating housing such that in its operating position it lies at a height above the container, and such that the first space borders the underlying bottom of the separating housing on which the first line connection leading to the container discharges. This mount ensures that liquid phase substances, such as oil or oil condensate from a gearbox, that have been separated on the separating medium can easily drain completely out of the first space by the action of gravity.

Also especially advantageously, the separating housing can form a hollow cylinder surrounding the first and second spaces. The hollow cylinder axis in the operating position can extend horizontally, so that the underlying region of the inner wall of the hollow cylinder forms the bottom bordering the first space and on which the first line connection discharges.

In this case, the separating housing can have one closed end and one open end that can be closed by a housing cover. The first line connection can be located on the closed end on the radially outer edge of the hollow cylinder.

With respect to the structural configuration of the separating medium, a cartridge-like filter insert can be inserted from the open end of the separating housing and can have the filter medium forming the separating medium. The filter insert forms an inner cylinder that borders the second space and that is open on the end of the separating housing that can be closed by the housing cover. Due to the fluid connection of the second space to the housing cover formed in this way, the second line connection leading to the atmosphere on the housing cover can be directly provided on this housing cover.

In this respect, the housing cover can have a central cavity connected flush to the open end of the inner cylinder that forms the second space in the closed position which seals the separating housing. The second line connection on the housing cover forms a drain channel extending away from the cavity in the radial direction.

Further especially advantageously, between the housing cover and separating housing, a connecting device can fix the housing cover in the closed position such that the second line connection forms a drain channel pointed downward for liquid phase substances from the cavity of the housing cover.

Also especially advantageously, the connecting device is made in the form of a snap safety having elastic retaining fingers on the housing cover and latch bodies that can be engaged to them by latching on the separating housing. Guide parts interact with the retaining fingers on the separating housing for the closed position of the housing cover dictating a rotary position with the underlying second line connection. Thus, liquid phase substances, for example, water, that has penetrated as far as the filter medium, can flow back again to the atmosphere by the action of gravity.

Especially preferred, a bushing of elastomer material can be slipped onto the separating housing such that it forms a snap ring keeping the retaining fingers latched. The bushing can be clipped with an annular groove located in its periphery to a carrier part of the mount so that the bushing, in addition to its securing function, forms a flexible support of the separating housing.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 3 is an exploded perspective view of only the separating housing of the ventilation and venting system of FIG. 1, shown slightly reduced in size relative to the practical exemplary embodiment; and FIG. 4 is a side elevational view in section of the separating housing of the ventilation and venting system of FIG. 1 drawn enlarged about 1.5 times compared to a practical exemplary embodiment.

DETAILED DESCRIPTION OF THE INVENTION

Figure 1:
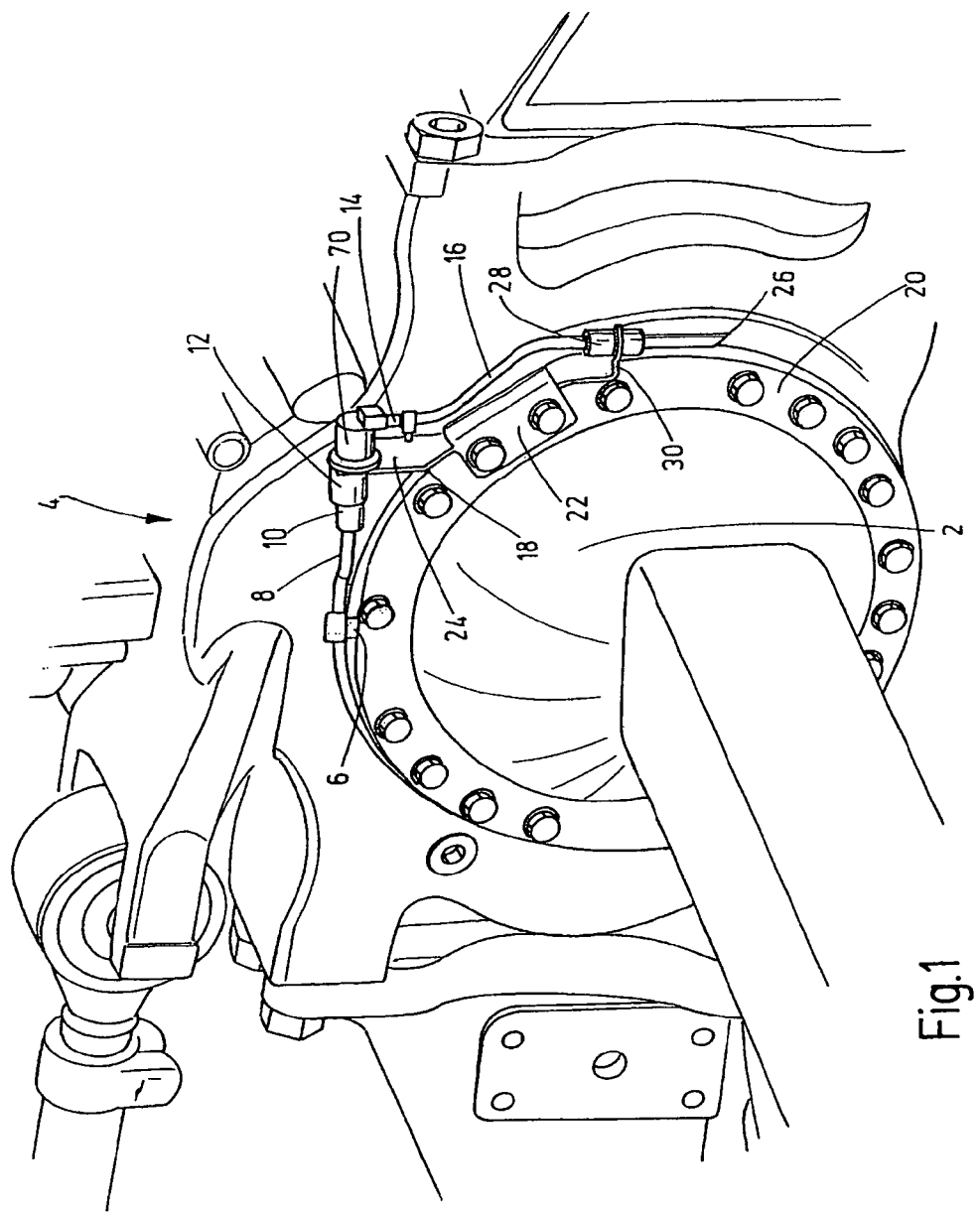
FIG. 1 is a broken-away, schematically simplified perspective view of one part of a motor vehicle drive axle with a gearbox provided with a ventilation and venting system according to an exemplary embodiment of the invention.

The invention is explained below using an example in which the container that can be ventilated and vented by the system according to the invention is the gearbox 2 of the drive axle 4 of a commercial vehicle. The axle is only partially and schematically suggested. In the manner which is conventional in this apparatus, the gearbox 2 is filled with oil. Above the oil surface, a certain air volume is provided. For pressure equalization over the entire operating temperature range of the drive axle 4 at a site on the gearbox 2, located at the highest level in the normal installation position of the gearbox 2 is a ventilation and venting connection 6. The connection 6 is connected to a first line connection 10 of a separating housing 12 via a first hose line 8 that forms a first section of a line system. The separating housing has a second line connection 14 from which a hose line 16 forming a second section of a line system leads to the atmosphere. A mount 18 screwed to the gearbox cover 20 fixes the separating housing 12 in its operating position such that the ventilating and venting connection 6 is located on the gearbox 2 at a higher level than the gearbox 2. The hose line 8 then forms a gradient section over which fluid drainage from the separating housing 12 to the gearbox 2 can take place by the action of gravity.

Figure 2:
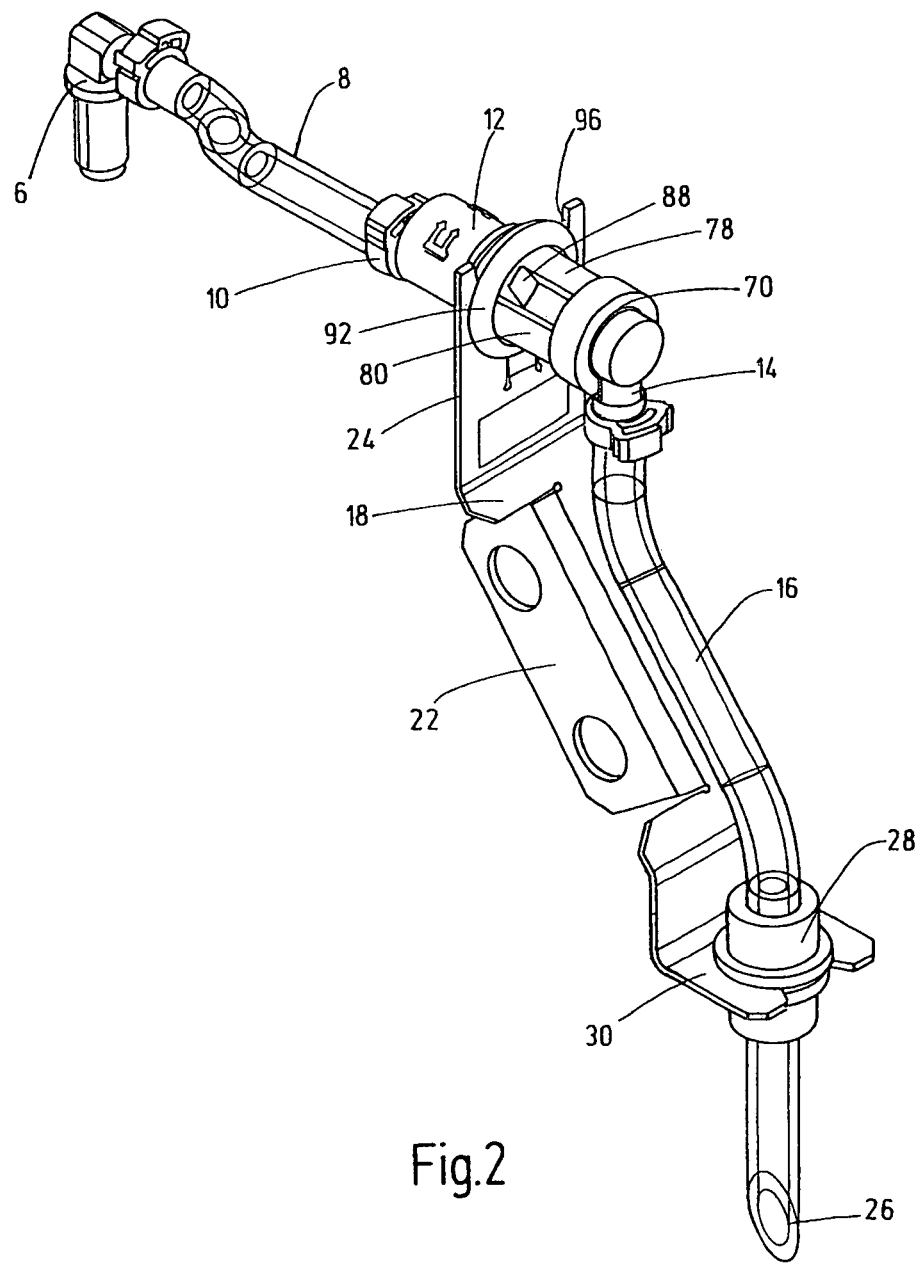
FIG. 2 is a perspective view of the separately shown ventilation and venting system of FIG. 1, shown enlarged compared to FIG. 1.

FIG. 2 shows details of the mount 18 with a screw clip 22 for screwing to the gearbox housing cover 20 and with a carrier part 24 extending at an angle upward from the clip 22 and forming the actual support for the separating housing 12. The second hose line 16 leading from the second line connection 14 of the separating housing 12 to the atmosphere extends from the second line connection 14 a considerable distance downward as far as the hose end 26, which hose end is beveled. This arrangement facilitates the flexible hose being able to elude, for example, the water jet of a washer when the associated vehicle is cleaned. At a distance from the hose end 26, the hose line 16 is held by an elastic hose support 28 clipped in a shoulder 30 forming the lower end of the mount 18.

FIGS. 3 and 4 show details of the separating housing 12. As is apparent, the separating housing 12, made substantially cylindrical, forms in the interior a hollow cylinder 32 with one closed end 34 and one open end 36. On the closed end 34, the first line connection 10 is positioned such that the inlet and drain channel 38 into the hollow cylinder 32 discharges on its lowermost region in the normal operating position. This region is farthest underneath the longitudinal axis 40 of the hollow cylinder 32 and forms the first space 42 bordering the inside wall of the hollow cylinder 32. This first space 42 is separated by the separating medium located in the separating housing 12 from the second space 44 of the atmosphere side.

In this example, the separating medium is formed by a filter medium 46 having oleophobic and hydrophobic properties and being part of a cartridge-like filter insert 48. In the exploded drawing from FIG. 3, filter insert 48 is separately visible and can be inserted into the hollow cylinder 32 from the open end 36 in the direction of the arrow 50. The filter medium 46 forms an inner cylinder 74 within a support structure 52 that has been injected molded from plastic with one closed end 54 and one open end 56. With the filter insert 48 installed, open end 56 is flush with the open end 36 of the hollow cylinder 42. In the region of the open end 56, the support structure 52 is sealed by an O-ring 58 relative to the inner wall of the hollow cylinder 32. Within the hollow cylinder 32, the first space 42 and the second space 44 are completely separated from one another by the filter medium 46 that is used as the separating medium in terms of an overflow of liquid phase substances in the form of oil or oil condensate from the first line connection 10 or of water from the second line connection 14, while a volumetric flow of air is enabled for pressure equalization between the spaces 42 and 44.

The support structure 52 has webs 60 extending lengthwise and webs 62 extending crosswise. Not all webs are visible in FIGS. 3 and 4, and not all webs have the same material cross section. Thus, in the installation position shown in FIG. 4, the web 60 at the top in FIG. 4 has a larger material cross section and adjoins the inside of the hollow cylinder 32. Conversely, according to the drawing on the underlying, lower inner wall region of the hollow cylinder 32 no strip adjoins it and extends lengthwise, so that between the filter insert 48 with its altogether three support strips and the inner wall of the hollow cylinder 32, an open space forms the first space 42. The spacer for preserving this open space is a button-like projection 64 that projects slightly radially on the strip 62 extending crosswise and that is not visible in FIGS. 3 and 4. The projection 64 adjoins the inner wall of the hollow cylinder 32 on the bottom of the first space 42 in the installation position shown in FIG. 4. When the filter insert 48 and the separating housing 12 are joined, as is suggested in FIG. 3 by the motion arrow 50, the filter insert 48 is inserted in the corresponding position. This position is maintained in operation since the O-ring 58 on the open end 56 of the support structure 42 with sealing pretensioning adjoins the inner wall of an edge depression 66 in the end section of the separating housing 12.

The separating housing 12 on the open end 36 can be closed by a housing cover 70 shown in FIG. 3. Cover 70 has a central cavity 72 that, in the closed position shown in FIG. 4, borders the open end 76 of the inner cylinder 74 formed by the filter medium 46 and contains the second space 44. From the cavity 72 of the cover 70, which cavity is connected to the second space 46, the second line connection 14 extends in the radial direction downward forming a drain channel 73, 73'. A connecting device in the form of a snap safety attaches the cover 70 to the separating housing 12. For this purpose, the cover 70 has axially extending retaining fingers 78 and 80 peripherally distributed and having openings 82. When the retaining fingers 78 and 80 are slipped onto the cylinder jacket 84, fingers 78, 80 latch to latching bodies 86. To ensure that the cover 70 can be moved into the closed position, i.e., into a snap connection, only when the rotary position shown in FIGS. 3 and 4 prevails, in which the second line connection 14 extends vertically downward, on the separating housing 12 guide bodies 88 are formed between the latch bodies 86. Free distances of varied size are between the guide bodies 88. Matched to those free distances, the retaining fingers 78 and 80 have a different width so that the cover 70 and the separating housing 12 can be moved together only in one desired rotary position such that the snap connection forms.

A bushing 92 of elastomer material shown separately in FIG. 3 and is illustrated in FIG. 4 in the active position. In the slipped-on active position, bushing 92 forms a snap ring that overlaps the retaining finger 78, 80 and ensures the latch engagement. The bushing 92 has a peripheral annular groove 94 with which it can be clipped into a segment 96 on the carrier part 24 of the mount 18 so that the bushing 92 has an additional function of forming an elastic support of the separating housing 12.

For effective protection against ingress of dust or dirt particles from the atmosphere, the filter medium 46 can have a corresponding filter fineness. In this design of the filter medium 46, oleophobic and hydrophobic properties can be implemented with simultaneous permeability to a degree necessary for pressure equalization.

While one embodiment has been chosen to illustrate the invention, it will be understood by those skilled in the art that various changes and modifications can be made therein without departing from the scope of the invention as defined in the appended claims.

What is claimed is:

1. A system for ventilating and venting containers containing a fluid volume, comprising:
    a line connecting a container interior to an atmosphere outside the container to equalize pressure during volume changes inside the container due to temperature changes;
    a separating housing having first and second spaces therein, said separating housing having a separating medium therein with oleophobic and hydrophobic properties, said separating medium separating said first and second spaces, said first space being connected to the container via said line, said second space being connected to the atmosphere via said line, said separating housing forming a hollow cylinder surrounding said first and second spaces and having a longitudinal axis extending horizontally in an operating position thereof, said first space being an underlying region of an inner wall of said hollow cylinder forming a bottom of said separating housing; and
    first and second line connections on said separating housing allowing liquid phase substances to drain from said first space to the container and from said second space to the atmosphere, respectively.

2. A system according to claim 1 wherein
    said separating medium comprises a filter medium.

3. A system according to claim 1 wherein
    a mount coupled to and fixing said separating housing in the operating position on the container at a height above the container.

4. A system according to claim 1 wherein
    said separating housing comprises a closed axial end and an open axial end closed by a cover, said first line connection being located on said closed end on a radially outer edge of said hollow cylinder.

5. A system according to claim 4 wherein
    said separating medium comprises a filter cartridge insert insertable through said open end of said separating housing, said cartridge insert forming an inner cylinder bordering said second space that is open on said open end of said separating housing.

6. A system according to claim 5 wherein
    said cover comprises a central cavity in a closed position thereof sealing said separating housing and being connected to an open end of said inner cylinder, said second line connection forming a drain channel extending out of said central cavity in a radial direction.

7. A system according to claim 4 wherein
    a connecting device couples said cover to said separating housing in a closed position such that said second line connection interacts with a central cavity of said cover to provide a drain channel pointed downward for substances.

8. A system according to claim 7 wherein
    said connecting device comprises a snap safety having elastic retaining fingers on said cover and latch bodies on said separating housing engaged by said retaining fingers, and comprises guide parts interacting with said retaining fingers in the closed position of said cover to dictate a rotary position of said second line connection.

9. A system according to claim 8 wherein
    a bushing of elastomeric material is on said separating housing, forms a snap ring keeping said retaining fingers in a latched position with said latch bodies and has an annular groove on a periphery thereof clipped to a carrier part of a mount coupled to the container thereby forming a flexible support for said separating housing.

10. A system for ventilating and venting containers containing a fluid volume, comprising:
    a line connecting a container interior to an atmosphere outside the container to equalize pressure during volume changes inside the container due to temperature changes;
    a separating housing having first and second spaces therein, said separating housing having a separating medium therein with oleophobic and hydrophobic properties, said separating medium separating said first and second spaces, said first space being connected to the container via said line, said second space being connected to the atmosphere via said line, said separating housing having a closed axial end and an open axial end closed by a cover, said first line connection being located on said closed end on a radially outer edge of said separating housing; and
    first and second line connections on said separating housing allowing liquid phase substances to drain from said first space to the container and from said second space to the atmosphere, respectively.

11. A system according to claim 10 wherein
    said cover comprises a central cavity in a closed position thereof sealing said separating housing, said second line connection forming a drain channel extending out of said central cavity in a radial direction.

12. A system for ventilating and venting containers containing a fluid volume, comprising:
    a line connecting a container interior to an atmosphere outside the container to equalize pressure during volume changes inside the container due to temperature changes;

a separating housing having first and second spaces therein, said separating housing having a separating medium therein with oleophobic and hydrophobic properties, said separating medium separating said first and second spaces, said first space being connected to the container via said line, said second space being connected to the atmosphere via said line;

first and second line connections on said separating housing allowing liquid phase substances to drain from said first space to the container and from said second space to the atmosphere, respectively; and a connecting device coupling a cover to said separating housing in a closed position thereof such that said second line connection interacts with a central cavity in said cover to provide a drain channel pointed downward for substances.

13. A system according to claim 12 wherein said connecting device comprises a snap safety having elastic retaining fingers on said cover and latch bodies on said separating housing engaged by said retaining fingers, and comprises guide parts interacting with said retaining fingers in the closed position of said cover to dictate a rotary position of said second line connection.

14. A system for ventilating and venting containers containing a fluid volume, comprising:

a line connecting a container interior to an atmosphere outside the container to equalize pressure during volume changes inside the container due to temperature changes;

a separating housing having first and second spaces therein, said separating housing having a separating medium therein with oleophobic and hydrophobic properties, said separating medium separating said first and second spaces, said first space being connected to the container via said line, said second space being connected to the atmosphere via said line;

first and second line connections on said separating housing allowing liquid phase substances to drain from said first space to the container and from said second space to the atmosphere, respectively; and a connecting device coupling a cover to said separating housing, said cover including a central cavity in a closed position thereof sealing said separating housing and being connected to an open end of an inner cylinder of said separating medium, said second line connection forming a drain channel extending out of said central cavity in a radial direction.

15. A system according to claim 14 wherein said connecting device has a snap safety having an elastic retaining fingers on said cover and latch bodies on said separating housing engaged by said retaining fingers, and has guide parts interacting with said retaining fingers in the closed position of said cover to dictate a rotary position of said second line connection; and a bushing of elastomeric material is on said separating housing, forms a snap ring keeping said retaining fingers in a latched position with said latch bodies and has an annular groove on a periphery thereof clipped to a carrier part of a mount coupled to the container thereby forming a flexible support for said separating housing.

16. A system for ventilating and venting containers containing a fluid volume, comprising:

a line connecting a container interior to an atmosphere outside the container to equalize pressure during volume changes inside the container due to temperature changes;

a separating housing having first and second spaces therein, said separating housing having a separating medium therein with oleophobic and hydrophobic properties, said separating medium separating said first and second spaces, said first space being connected to the container via said line, said second space being connected to the atmosphere via said line;

first and second line connections on said separating housing allowing liquid phase substances to drain from said first space to the container and from said second space to the atmosphere, respectively; and a bushing of elastomeric material being on said separating housing and having an annular groove on a periphery thereof clipped to a carrier part of a mount coupled to the container thereby forming a flexible support for said separating housing.

* * * * *